Jan. 21, 1936.  D. K. GANNETT ET AL  2,028,278
VACUUM TUBE TESTING SYSTEM
Filed Aug. 18, 1934
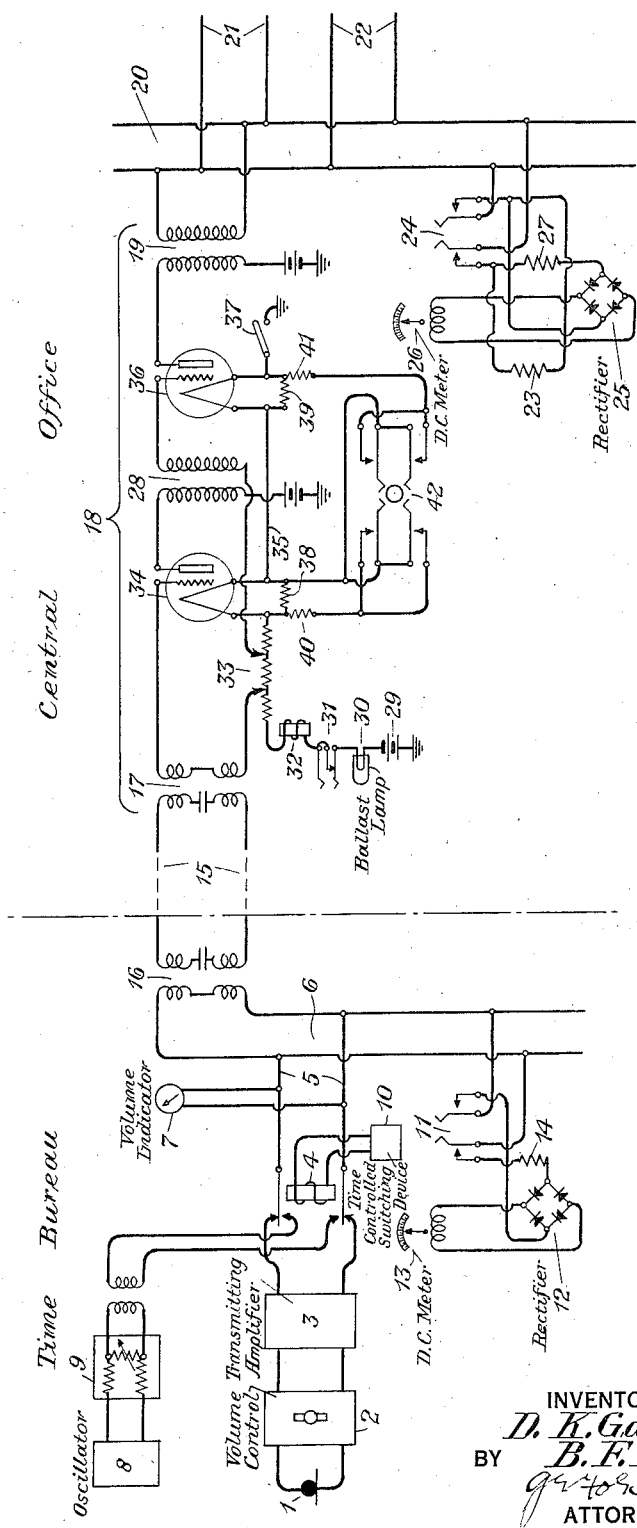
INVENTORS
D. K. Gannett and
BY B. F. Lewis
ATTORNEY Patented Jan. 21, 1936

2,028,278

UNITED STATES PATENT OFFICE 2,028,278

VACUUM TUBE TESTING SYSTEM

Danforth King Gannett, Jackson Heights, and Benjamin F. Lewis, Flushing, N. Y., assignors to American Telephone and Telegraph Company, a corporation of New York Application August 18, 1934, Serial No. 740,510

5 Claims. (Cl. 179—175)

This invention relates to a vacuum tube testing system and, particularly, to a method and means by which the vacuum tubes of an amplifier used in a signaling circuit may be tested without removing them from the circuit in which they are employed, and without affecting the service rendered by the system in which such amplifier is used.

In a time announcement system in which the time of the day is given at fairly frequent intervals, say every 15 seconds, to telephone subscribers requesting such service, it is practically necessary that all tests to determine the efficiency of such system shall be made without removing the apparatus from such system. In the copending application of B. F. Lewis, Serial No. 740,497, filed August 18, 1934, is described a method and means for determining the transmission levels at the output of various amplifiers upon such a system, the method and means being such as to utilize for the level measurement a particular signal impulse, repeatedly transmitted the normal function of which is to indicate the exact second of the announced time.

The present invention has for its object the determination of the electrical condition of the vacuum tubes of the amplifiers employed in such time announcement system, or equivalent circuit, the determination being based upon the difference in the transmission levels of the repeated signal impulse resulting from changes of a predetermined percentage of the filament activating currents of the vacuum tubes of the amplifier.

This invention will be clearly understood from the following description when read in connection with the attached drawing, showing schematically a form of embodiment of the invention.

In the drawing, the transmitter 1 is connected to the input of the volume control network 2 which in turn is connected to the transmitting amplifier 3, all of which constitutes the speech transmission branch of a time bureau of a time announcement system. The output of the amplifier is normally connected through the contacts of relay 4 to the leads 5 which in turn are connected to the supply circuit 6 by which the time announcements are fed to the central offices within a given area. A volume indicator 7, when connected across the leads 5, serves to enable the operator to make suitable adjustment of the volume control network to keep the output level within determined limits required for good service. An oscillator 8 having a potentiometer 9 connected to the output thereof, is effectively connected to the inner contacts of relay 4. The said oscillator and potentiometer constitute the signal tone branch of the supply circuit of the time bureau. That relay is controlled by means of a timing device 10. The timing device, which is fully described in the aforesaid copending application of Lewis, is intended to connect the speech transmission branch and the tone signal branch alternately to the leads 5 and to maintain them connected thereto throughout the determined interval of time.

Connected across the supply circuit 6 is a device for measuring the transmission level thereat consisting of a key 11 to the contacts of which are connected, in series, a rectifier 12, a direct current meter 13, and a resistance 14. That transmission level measuring device which operates upon the impulse of 800 cycle signaling current transmitted from the oscillator 8, during the closing of the inner contacts of relay 4, is sufficiently sensitive and fast to allow a measurement to be made of the level of the signal current transmitted during the relatively short time in which the inner contacts of the relay are closed.

15 represents a trunk that extends from the time bureau to a distant central office being connected by the repeating coil 16 to the supply circuit 6 at the time bureau, and also being connected by the repeating coil 17 to the input side of the amplifier 18 at the distant office. The output of this amplifier, which is represented as having two stages, is connected by the repeating coil 19 to the supply circuit 20 from which a plurality of trunks 21 and 22 extend to various points such as positions of the switchboard in the central office at which the amplifier has been located, or to more distant central offices. Also, bridged across the supply circuit is another transmission level measuring circuit, a portion of which is the same as that shown at the time bureau. The sole difference resides in the use of the resistance 23 which is bridged across the outer contacts of the switch 24 so as to be in shunt with the series circuit comprising the rectifier 25, the meter 26, and the resistance 27.

The several stages of amplification of the amplifier 18 are coupled by the transformer 28. The filament activating current of the tubes of both stages is supplied by the source 29, this circuit including a ballast lamp 30, a key 31, retardation coil 32, a potentiometer 33, the filament of tube 34, conductor 35, the filament of the tube 36, and a switch 37, to ground. Due to the fact that the ballast lamp used in such a filament circuit provides a current slightly in excess of the normal filament current for the vacuum tubes employed, the filaments of the tubes 34 and 36 have been shunted by the resistances 38 and 39, respectively. The resistances 40 and 41 shown in connection with the resistances 38 and 39, respectively, and the key 42, form part of the circuit for carrying out the method in which this invention is embodied.

Since the purpose of the invention is to enable the time signal currents to be utilized to determine the electrical condition of the vacuum tubes of the amplifiers associated with such system, it will facilitate the understanding of the invention to describe briefly the manner in which time announcements are made by this system. The operator at the time bureau, upon the lighting of a signal lamp, will make an announcement according to a certain formula such as, "When you hear the signal the time will be three, nine and one-half." At the end of the given interval in which such announcement must be made, the clock controlled switching mechanism 10 causes the operation of the relay 4 which disconnects the speech transmission branch from the leads 5 and connects thereto the signal tone branch. Thereafter, for a given interval, such as ½ of a second, the signal current from the oscillator 8 of a frequency of 800 cycles, will be transmitted to the supply circuit 6 and thence over the trunk 15 to the amplifier 18, where it will be raised to the proper level and transmitted to the trunks 21 and 22 over which it will be distributed to the various subscribers connected to those trunks. It is important that this time announcement shall reach every subscriber within the area of a particular bureau at substantially the same level. As has been described in the copending application of Lewis, referred to hereinbefore, that result is accomplished by having the attendants at each amplifier listen in on the circuit during the interval in which the oral announcement is being made, and upon the termination of that interval, to operate keys such as 11 and 24 to connect to the output side of the amplifiers the transmission level measuring device by which the transmission level at those points may be determined from the signal impulse transmitted from the oscillator 8 over the system to indicate the exact instant of time.

That, however, does not give a complete picture of the transmission condition of the system. It is necessary to know the electrical condition of the vacuum tubes forming parts of the amplifiers. Considering repeater 18, and assuming that switch 37 is closed, current will flow from the battery 29 through the ballast lamp 30, contact of key 31, retardation coil 32, potentiometer 33, the filament of tube 34 shunted by resistance 38, conductor 35, filament of tube 26 shunted by resistance 39, and key 37, to ground. The resistances 38 and 39 are so proportioned with respect to the tubes with which they are associated that, for a given voltage of battery 29 and a given ballast lamp 30, the emission from those filaments will be such as to amplify the 800 cycle impulse and raise it to the required level for transmission over the circuits 20 and 21. Furthermore, it is desirable to point out that the ballast lamp is so designed as to ensure the continuous flow of the normal filament current to one of the tubes when the other tube is being tested.

In making the test, the attendant at amplifier 18 will listen across the circuit with a receiver (not shown) until the conclusion of the oral announcement, and will thereupon operate key 24 which will connect across the supply circuit 20 the transmission level device 25—26—27. There will also be connected across that circuit a resistance 23, the purpose of which is to provide a load across the supply circuit having about the same relation to the amplifier output impedance of a terminal amplifier as a load of an intermediate amplifier has to the output impedance of the intermediate amplifier. The attendant will then note the level indicated by the meter 26 and then he will operate key 42, say to the left. This shunts the resistance 40 around resistance 38 and the filament of tube 34, the effect of which is to reduce the filament current of the tube by a given percentage, say 6%. When the next succeeding announcement has been concluded, the attendant will then operate key 24 and measure the output level of the amplifier with the filament current of the tube 34 thus reduced. If the difference between the two readings of meter 26 exceeds a specified value it indicates permanent impairment of the tube and leads to its replacent. Assuming that tube to be satisfactory, the attendant will operate key 42 to the right which will shunt resistance 41 around resistance 39 and the filament of tube 36, thereby effecting a similar reduction in the filament current of that tube. He will then measure the level of the signal tone as described above and determine the condition of that tube.

The invention, hereinbefore described, affords a simple and efficient method and means for determining the electrical condition of vacuum tubes of amplifiers employed in a circuit that is in almost continuous operation throughout 24 hours of each day. The use of this invention avoids the necessity for the removal of the tubes from the amplifiers for the making of filament activity tests thereon, which removal is, of course, fraught with danger of interruption of the service. Also the avoidance of removing the tubes to another test set is particularly desirable in connection with the time announcement system since only a few tubes are located in one central office. The use of a separate tube test set would require the provision of a set for only a small number of tubes or the transportation of the tubes to and from some office at which a test set would be located.

While the invention has been disclosed as embodied in a particular form, it is capable of embodiment in other and different forms without departing from the spirit and scope of the appended claims.

What is claimed is:

1. In a time announcement system in which a signal impulse of given voltage and duration is transmitted to subscribers over lines containing amplifiers to indicate a given instant of time, the method of determining the electrical condition of each of two vacuum tubes of an amplifier which consists in activating the filaments of both tubes by causing the normal currents to flow therethrough and measuring the transmission level at the output of said amplifier upon the transmission of one of said signal impulses, then changing by a known percentage the filament activating current of the first of said tubes and again measuring the transmission level at the amplifier output upon the transmission of another of said signal impulses.

2. In a time announcement system in which a signal impulse of given voltage and duration is transmitted to subscribers over lines containing amplifiers to indicate a given instant of time, the method of determining the electrical condition of each of two vacuum tubes of an amplifier which consists in activating the filaments of both tubes by causing the normal currents to flow therethrough and measuring the transmission level at the output of said amplifier upon the transmission of one of said signal impulses, then changing by a known percentage the filament activating current of the first of said tubes and again measuring the transmission level at the amplifier output upon the transmission of another of said signal impulses, then restoring to normal the filament current of the said first tube and changing by a known percentage the filament current of the second tube and measuring the transmission level at the amplifier output upon the transmission of another of said signal impulses.

3. In a time announcement system the combination with a speech input branch of a signal tone branch, a trunk having a vacuum tube amplifier therein, switching means to connect each of said branches in succession to said trunk for a prefixed interval of time, means connected to the output of said amplifier to measure the level thereat of the signal tone transmitted over said trunk, a source of filament current, and means individual to and connected with the vacuum tubes of said amplifier to vary at will and by known percentages the filament activating current of each of said tubes.

4. In a time announcement system the combination with a speech input branch of a signal tone branch, a trunk having a vacuum tube amplifier therein, switching means to connect each of said branches in succession to said trunk for a pre-fixed interval of time, means connected to the output of said amplifier to measure the level thereat of the signal tone transmitted over said trunk, a source of filament current, means individual to and connected with the vacuum tubes of said amplifier to vary at will and by known percentages the filament actuating current of each of said tubes, and stabilizing means connected to said source of filament current to prevent a change in the filament current in one of said tubes when a change is made in the filament current of the other tube.

5. In a signal amplifier, the combination with a plurality of vacuum tubes coupled together of a source of uniform signals of known voltage connected to the input of said amplifier, and a measuring circuit adapted to be connected to the output of said amplifier including a D. C. meter and a rectifier, the said measuring circuit being shunted by a resistance having about the same impedance as the last tube of the amplifier.

DANFORTH K. GANNETT.
BENJAMIN F. LEWIS.